United States Patent
Ozeki

(10) Patent No.: US 11,163,184 B2
(45) Date of Patent: Nov. 2, 2021

(54) CONTROL DEVICE AND LIQUID CRYSTAL DISPLAY DEVICE PROVIDED WITH CONTROL DEVICE

(71) Applicant: SHARP KABUSHIKI KAISHA, Sakai (JP)

(72) Inventor: Tsuyoshi Ozeki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 334 days.

(21) Appl. No.: 16/326,526

(22) PCT Filed: Sep. 12, 2017

(86) PCT No.: PCT/JP2017/032838
§ 371 (c)(1),
(2) Date: Feb. 19, 2019

(87) PCT Pub. No.: WO2018/047973
PCT Pub. Date: Mar. 15, 2018

(65) Prior Publication Data
US 2021/0142743 A1    May 13, 2021

(30) Foreign Application Priority Data
Sep. 12, 2016    (JP) .............................. JP2016-177928

(51) Int. Cl.
| | |
|---|---|
| G09G 3/34 | (2006.01) |
| G09G 3/36 | (2006.01) |
| G02F 1/133 | (2006.01) |
| H05B 47/10 | (2020.01) |
| H05B 45/18 | (2020.01) |
| G02F 1/1335 | (2006.01) |

(52) U.S. Cl.
CPC ........ *G02F 1/133* (2013.01); *G02F 1/133612* (2021.01); *G09G 3/3426* (2013.01); *G09G 3/36* (2013.01); *H05B 45/18* (2020.01); *H05B 47/10* (2020.01); *G09G 2320/041* (2013.01); *G09G 2320/045* (2013.01); *G09G 2320/064* (2013.01); *G09G 2320/0646* (2013.01)

(58) Field of Classification Search
CPC ....... G09G 3/34; G09G 3/3426; G09G 3/3433
See application file for complete search history.

(56) References Cited

U.S. PATENT DOCUMENTS

| | | | |
|---|---|---|---|
| 2009/0091265 A1* | 4/2009 | Song ................... | G09G 3/3413 315/185 R |
| 2013/0249958 A1 | 9/2013 | Matsuura | |
| 2015/0070337 A1* | 3/2015 | Bell ...................... | G09G 3/007 345/207 |

FOREIGN PATENT DOCUMENTS

| | | |
|---|---|---|
| JP | 2013-161059 A | 8/2013 |
| JP | 2016-001339 A | 1/2016 |

* cited by examiner

*Primary Examiner* — Kevin M Nguyen
(74) *Attorney, Agent, or Firm* — ScienBiziP, P.C.

(57) ABSTRACT

Reduction of luminance is suppressed while effectively suppressing temperature rising of an LED of a backlight and a peripheral circuit. A backlight driving control unit (8) of a control device (50) included in a liquid crystal display device (10) according to an aspect of the invention increases and reduces, on the basis of two thresholds, power supplied to a backlight, and makes a time during which the power supplied to the backlight (9) is reduced longer than a time during which the power supplied to the backlight (9) is increased.

7 Claims, 12 Drawing Sheets

CONTROL DEVICE AND LIQUID CRYSTAL DISPLAY DEVICE PROVIDED WITH CONTROL DEVICE

TECHNICAL FIELD

The present invention relates to a control device and a liquid crystal display device provided with the control device, and more specifically relates to a control device that controls a backlight, which has an LED (light emitting diode), and a liquid crystal panel, and a liquid crystal display device provided with the control device.

BACKGROUND ART

An LED (light emitting diode) used as a backlight light source of a liquid crystal display device has a higher response speed than that of a CCFL (Cold Cathode Fluorescent Lamp). Thus, there is an advantage that it is easy to perform blinking of light, such as turning on or turning off of light, and to perform adjustment of brightness.

On the other hand, since it is known that the LED is not resistant to heat, when an appropriate heat dissipation countermeasure is not taken, reduction in light emission efficiency or lifetime is caused.

For example, a liquid crystal display device disclosed in PTL 1 includes a backlight driving control unit that prevents lifetime reduction and thermal destruction of an LED and a peripheral circuit. According to the liquid crystal display device of PTL 1, in a case where average luminance of a video for one frame is equal to or less than a preset threshold, it is determined from luminance distribution that a high gradation signal of a fixed value or more is included in a video signal, and an LED duty ratio that is detected exceeds a preset threshold for a fixed time, the backlight driving control unit reduces power supplied to a backlight.

A liquid crystal display device disclosed in PTL 2 includes a control device that suppresses an increase in instantaneous power consumption of a backlight subjected to local dimming control. When an input duty exceeding a certain threshold is continuously input, the control device turns off one of a plurality of light source blocks in order to reduce power.

CITATION LIST

Patent Literature

PTL 1: Japanese Unexamined Patent Application Publication No. 2013-161059 (published on Aug. 19, 2013)
PTL 2: Japanese Unexamined Patent Application Publication No. 2016-1339 (published on Jan. 7, 2016)

SUMMARY OF INVENTION

Technical Problem

In a case of a technique of PTL 1, however, when a high input duty is continuously input, a current of the LED is reduced, thus posing a problem that luminance of a video that is actually displayed on a display panel is reduced.

Also in a case of a technique of PTL 2, when a high input duty is continuously input, a current of an LED is reduced, so that luminance of a video that is actually displayed on a display panel is reduced. In addition, in the case of the technique of PTL 2, a part of the light source blocks is turned off to reduce the current of the LED, so that it is concerned that luminance unevenness is caused.

Thus, the invention is made in view of the aforementioned problems and an object thereof is to achieve a control device that controls a liquid crystal panel and a backlight and that suppresses reduction of luminance while effectively suppressing temperature rising of an LED of a backlight and a peripheral circuit, and a liquid crystal display device provided with the control device.

Solution to Problem

In order to solve the aforementioned problems, a control device according to an aspect of the invention is a control device that controls a backlight having a plurality of light sources, and includes a control unit that performs lighting of each of the light sources with first brightness when a state where brightness of the light source, which is set in accordance with luminance information of an image obtained from a video signal, is set to predetermined brightness or more is kept, and repeats lighting with second brightness and lighting with third brightness when a predetermined time has lapsed, the second brightness and the third brightness being lower than the first brightness, in which the second brightness is lower than the third brightness, and a lighting period with the second brightness is longer than a lighting period with the third brightness.

In order to solve the aforementioned problems, a liquid crystal display device according to an aspect of the invention includes: the control device including the aforementioned configuration; a liquid crystal panel, and the backlight that is arranged on a rear surface side of the liquid crystal panel and has the plurality of light sources.

Advantageous Effects of Invention

According to an aspect of the invention, it is possible to suppress reduction of luminance while effectively suppressing temperature rising of an LED of a backlight and a peripheral circuit.

DESCRIPTION OF EMBODIMENTS

Embodiment 1

<Configuration of Liquid Crystal Display Device 10>

A liquid crystal display device that is an embodiment of a display device according to the invention will be described below with reference to FIGS. 1 to 7.

Figure 1:
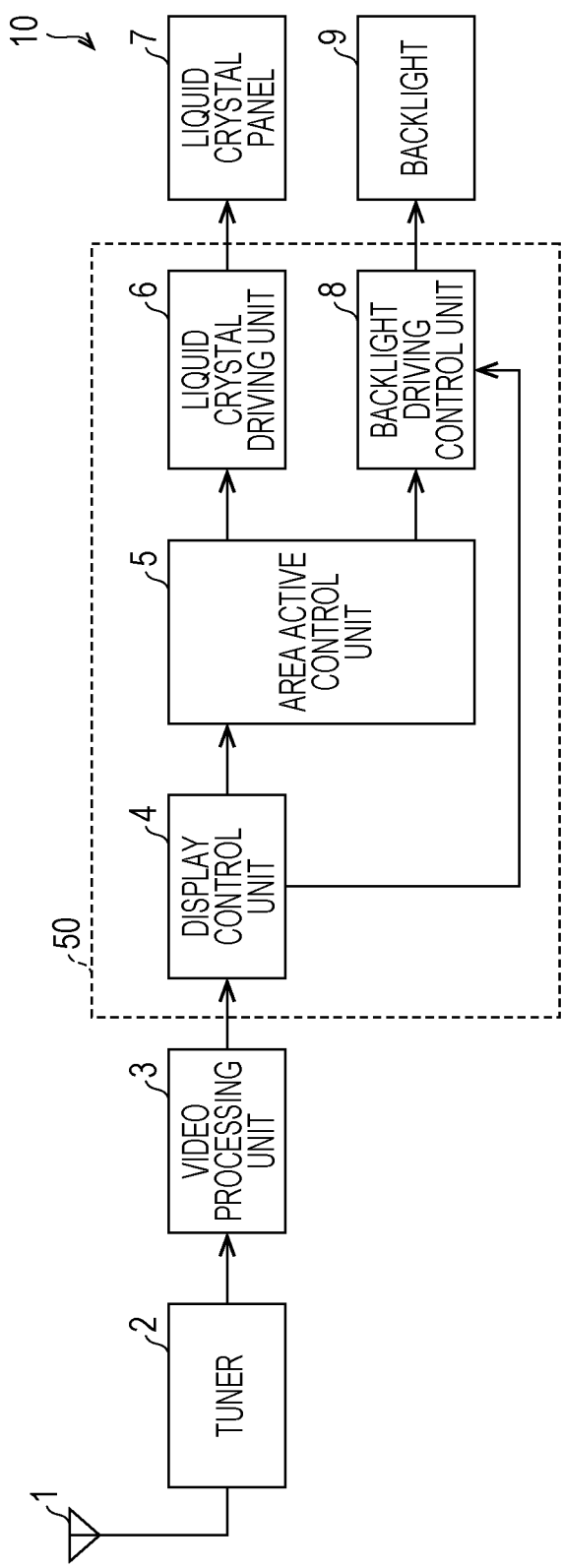
FIG. 1 is a block diagram illustrating a schematic configuration of a liquid crystal display device including a control device according to an embodiment of the invention.

FIG. 1 is a block diagram illustrating a schematic configuration of a liquid crystal display device according to the present embodiment 1.

A liquid crystal display device 10 (display device) of the present embodiment 1 includes, as illustrated in FIG. 1, an antenna 1, a tuner 2, a video processing unit 3, a display control unit 4, an area active control unit 5, a liquid crystal driving unit 6, a liquid crystal panel 7, a backlight driving control unit 8 (control unit), and a backlight 9. Among them, the display control unit 4, the area active control unit 5, the liquid crystal driving unit 6, and the backlight driving control unit 8 constitute a control device 50.

In the liquid crystal panel 7, (m×n) pixels are arranged in a two dimensional manner. Each of the pixels includes an R display element that transmits red light, a G display element that transmits green light, and a B display element that transmits blue light. The R display element, the G display element, and the B display element are arranged side by side in a row direction and the three display elements form one pixel. Note that, though an example that the number of colors is three is taken for the liquid crystal panel 7 in the present embodiment 1, the number of colors may be four or more.

A display screen of the liquid crystal panel 7 is divided into a plurality of parts, for example, (i×j) parts. Note that, a term of "part" herein is defined for convenience to indicate a partial display screen.

The liquid crystal driving unit 6 is a driving circuit of the liquid crystal panel 7. The liquid crystal driving unit 6 outputs a signal (voltage signal), which controls a light transmittance of a display element of the liquid crystal panel 7, on the basis of display data (hereinafter, referred to as liquid crystal data) that is output from the area active control unit 5 and used for driving the liquid crystal panel 7. A voltage output from the liquid crystal driving unit 6 is written in a pixel electrode (not illustrated) in the display element of the liquid crystal panel 7 and the light transmittance of the display element changes in accordance with the voltage written in the pixel electrode.

The backlight 9 is provided on a rear surface side of the liquid crystal panel 7 and illuminates the rear surface of the liquid crystal panel 7 with backlight light. The backlight 9 has a plurality of LEDs arranged in a two-dimensional manner as light sources. The LEDs are provided in such a manner that a predetermined number of LEDs form one set so as to correspond to each of the parts of the display screen of the liquid crystal panel 7, which are divided into (i×j). The predetermined number of LEDs as one set constitute an LED unit. That is, one LED unit is associated with one part.

The backlight driving control unit 8 is a driving circuit that drives each of the LEDs of the backlight 9 to be turned on by PWM (Pulse Width Modulation) control. On the basis of backlight control data (hereinafter, referred to as LED data in some cases) that is output from the area active control unit 5 and used to drive the backlight 9, the backlight driving control unit 8 outputs, to the backlight 9, a signal (SPI (Serial Peripheral Interface) signal) that controls luminance of each of the LEDs.

The backlight driving control unit 8 further detects a duty ratio (hereinafter, referred to as an LED_DUTY) of an LED arranged in any preset pattern among the LEDs driven by the PWM control, and controls power to be supplied to the backlight 9 in accordance with the detected LED_DUTY. The control of the power of the backlight 9 will be described in detail below.

On the basis of an input image generated by the display control unit 4, the area active control unit 5 obtains light transmittances of all the display elements included in the liquid crystal panel 7 and generates the liquid crystal data representing the obtained light transmittances. Then, the area active control unit 5 outputs the generated liquid crystal data to the liquid crystal driving unit 6.

On the basis of the input image generated by the display control unit 4, the area active control unit 5 also obtains, for each of the parts of the display screen of the liquid crystal panel 7 divided into (i×j) parts, luminance of LEDs included in an LED unit corresponding to the part. Specifically, the area active control unit 5 obtains luminance of all the LEDs included in the backlight 9 and generates the LED data representing the obtained luminance of the LEDs. Then, the area active control unit 5 outputs the generated LED data to the backlight driving control unit 8.

The display control unit 4 generates the input image from average luminance (APL) and luminance distribution of images for one frame of a video signal, which are calculated by the video processing unit 3 in a previous stage, and outputs the generated input image to the area active control unit 5.

From a video signal extracted by the tuner 2 from a radio wave received by the antenna 1, the video processing unit 3 calculates average luminance (APL) and luminance distribution of images for one frame and outputs the APL and the luminance distribution that are calculated to the display control unit 4.

<Backlight Driving Control Unit 8>

Figure 2:
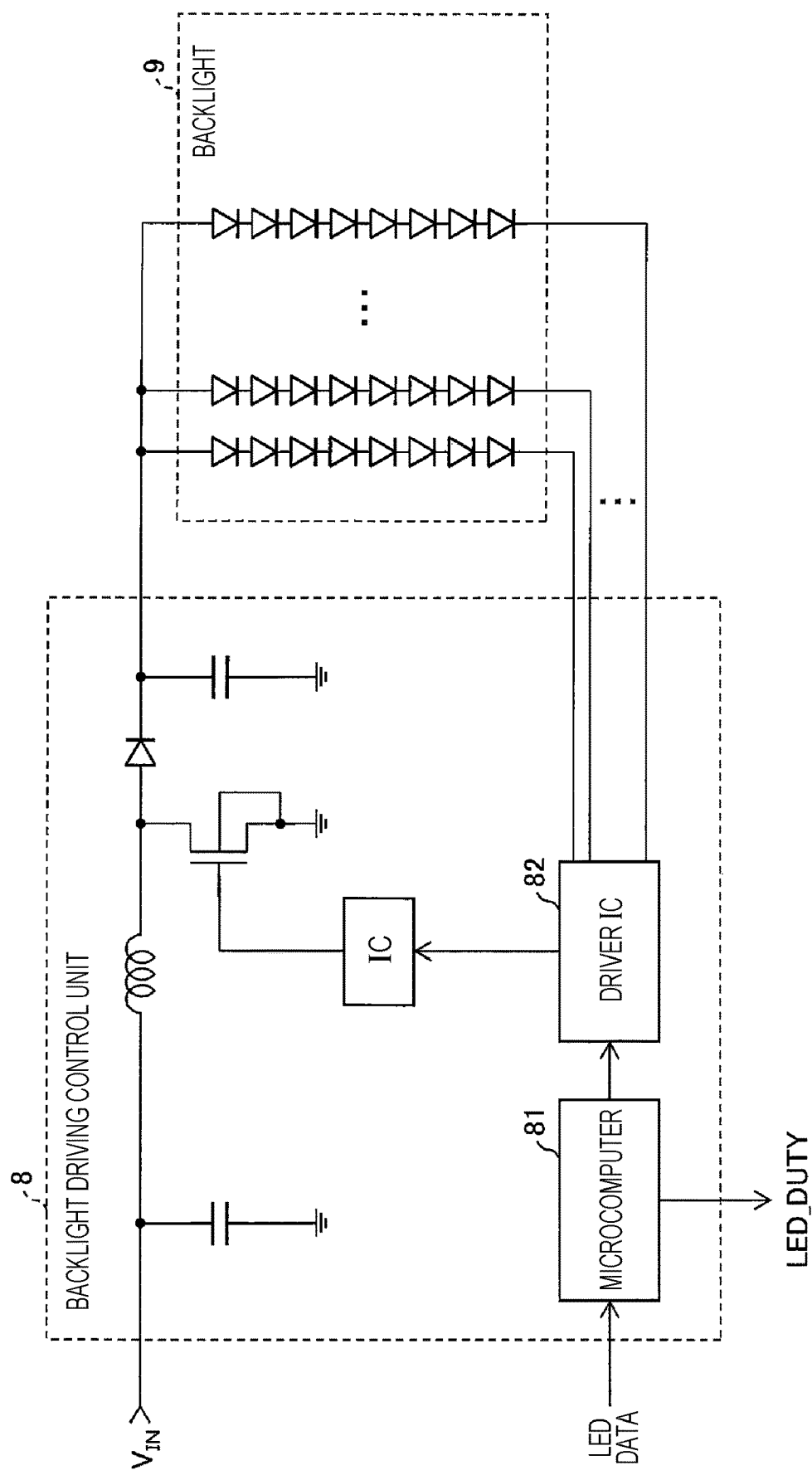
FIG. 2 illustrates a detailed configuration of a part of the liquid crystal display device illustrated in FIG. 1.

FIG. 2 is a block diagram of a schematic configuration of the backlight driving control unit 8. The backlight driving control unit 8 will be described in detail with reference to FIG. 2.

As illustrated in FIG. 2, the backlight driving control unit 8 has a microcomputer 81 and a driver IC 82. The microcomputer 81 obtains the LED data output from the area active control unit 5 and drives, on the basis of the LED data, the driver IC 82, which is connected to an LED of the backlight 9 that is to be turned on, by the PWM control.

That is, the backlight driving control unit 8 controls the duty ratio (LED_DUTY) of each of the LEDs of the backlight 9 in accordance with a video signal.

Figure 3:
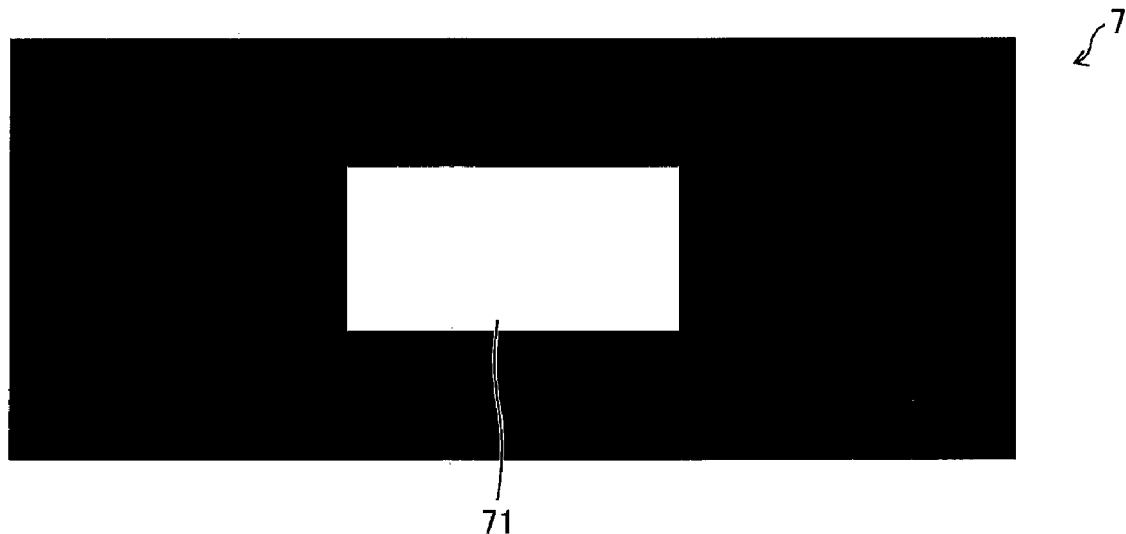
FIG. 3 illustrates an example of an input video in the liquid crystal display device illustrated in FIG. 1.

Here, FIG. 3 illustrates an example that a screen center part 71 of the liquid crystal panel 7 displays a video signal brighter than that of the other region.

Figure 4:
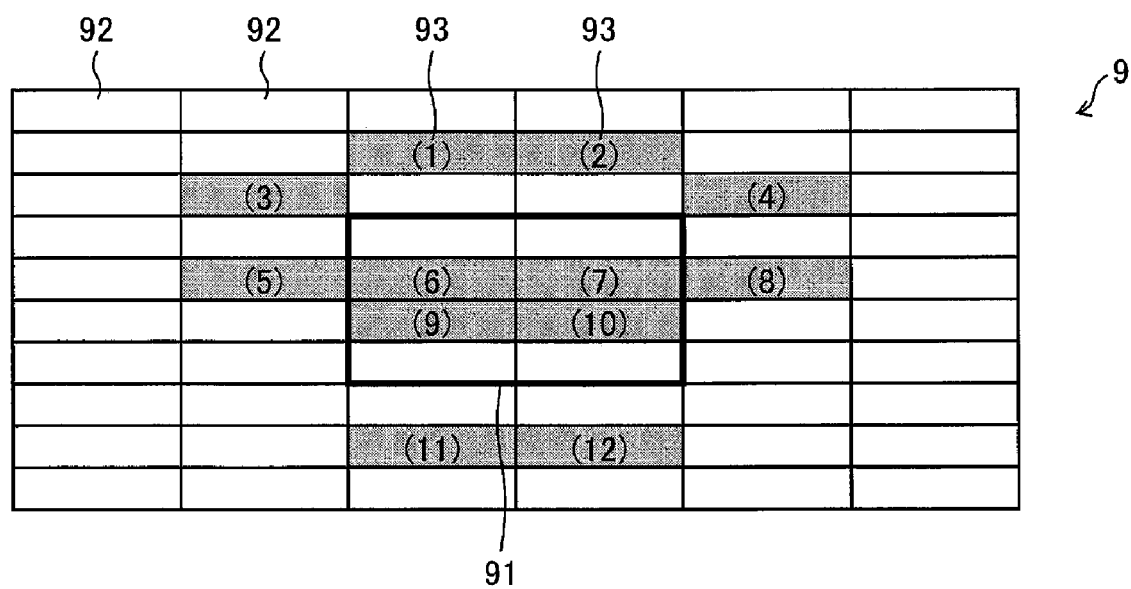
FIG. 4 illustrates an example of LED_DUTY reading areas of a backlight in the liquid crystal display device illustrated in FIG. 1.

FIG. 4 illustrates an example of LED_DUTY reading areas 93 ((1) to (12) in FIG. 4) set in LED units 92 of the backlight 9. Each of the LED_DUTY reading areas 93 is constituted by an LED arranged at a preset position in the LED unit 92.

In a case where the video signal in which the screen center part 71 of the liquid crystal panel 7 is brighter than the other part is input as illustrated in FIG. 3, the backlight 9 is controlled to be driven so that the power is concentrated on an LED corresponding to the screen center part 71 on the screen in accordance with the APL and the luminance distribution which are obtained by the video processing unit 3. In this case, the backlight 9 is controlled to be driven so that the power is concentrated on an LED arranged in a center part 91 of the backlight 9 illustrated in FIG. 4.

<Operation of Backlight Driving Control Unit 8>

An operation example of the backlight driving control unit 8 will be described below.

The backlight driving control unit 8 performs power limiter control for the LED data obtained from the area active control unit 5 and decides the LED_DUTY.

That is, since the backlight driving control unit 8 performs control so that the power is constant by the APL and the power limiter control, the power that is able to be concentrated on one place is reduced as the APL is increased.

Under the control as described above, for example, in a case where an image (for example, 255 of 8-bit gradation and 25% of the APL) illustrated in FIG. 3 is input, the power is concentrated only on the screen center part 71 and temperatures of the LED of the center part 91 of the backlight 9 illustrated in FIG. 4 and a driving circuit part rise.

In order to avoid this, a case where the APL (for example, 30%) is equal to or less than a threshold (first threshold) (which is able to be set to any value: the threshold is set to 35% in the present embodiment) that indicates a limit value of power limiter and it is recognized from luminance distribution of input gradation that a high gradation signal of a fixed value or more is input (for example, 800 or more of 10-bit gradation) is set as a condition to start monitoring of the LED_DUTY. In a case where a video signal having the APL that is equal to or more than the threshold is input, control is performed to make the power constant and the LED_DUTY is limited, so that monitoring does not need to be performed.

Whether the APL (for example, 30%) is equal to or less than the threshold (which is able to be set to any value) and whether a signal that has high gradation from luminance distribution of input gradation is input are determined by the display control unit 4. The display control unit 4 is configured to output a result of the determination to the backlight driving control unit 8. That is, when determining that the power may be concentrated in a display video, the display control unit 4 is configured to output the result of the determination to the backlight driving control unit 8.

After receiving the result of the determination from the display control unit 4, when the detected duty ratio (LED_DUTY that is monitored) of the LED is equal to or more than a preset threshold (hereinafter, described as a second threshold sduty: which is able to be set to any value) for a fixed time, the backlight driving control unit 8 performs control to reduce the power supplied to the backlight 9, and when the duty ratio is less than another preset threshold (hereinafter, described as a third threshold tduty: which is able to be set to any value) for another certain fixed time, the backlight driving control unit 8 performs control to increase the power supplied to the backlight 9.

Note that, in the present specification, brightness of the LED when the LED_DUTY is equal to or more than the second threshold sduty is defined as third brightness and brightness of the LED when the LED_DUTY is less than the third threshold tduty is defined as second brightness, and brightness of the LED in a case of the LED_DUTY before being subjected to the control by the backlight driving control unit 8 is defined as first brightness.

<Monitoring of LED_DUTY>

Monitoring of the LED_DUTY in the backlight driving control unit 8 will be described.

The backlight driving control unit 8 monitors, by the microcomputer 81, the LED_DUTY of the driver IC 82 connected to the LED constituted in the LED_DUTY reading area 93 corresponding to a part in which an image, for which determination is performed that the power may be concentrated, is displayed.

Note that, the LED_DUTY reading area 93 is able to correspond to any video as long as securing an area of 30% (APL decided above) or more with respect to a part obtained by dividing the display screen.

When an ON_DUTY of the LED is equal to or more than the sduty for a certain fixed time (which is able to be set to any value), the microcomputer 81 controls the driver IC 82 to reduce the power, and when the ON_DUTY is less than the tduty for another certain fixed time (which is able to be set to any value), the microcomputer 81 controls the driver IC 82 to increase the power. Here, the sduty is less than the LED_DUTY before being subjected to the control by the backlight driving control unit 8.

Thereby, it is possible to efficiently perform control with less load compared to a case where temperature is always monitored, and since a temperature sensor is not necessary, a system is able to be constituted inexpensively.

<LED_DUTY Control (LED Duty Control)>

Next, LED_DUTY control in the liquid crystal display device 10 will be described below with reference to a flowchart illustrated in FIG. 5. Note that, each of parameters described in the flowchart illustrated in FIG. 5 will be indicated in a table 1.

TABLE 1

| Variable name | Initial value | Meaning |
| --- | --- | --- |
| areaid | — | LED area block address |
| rduty | — | LED_DUTY reading value of area specified by areaid |
| sduty[i] | 100 d, 150 d, 100 d, 150 d, 220 d, 150 d, 110 d, 160 d, 110 d | Threshold (1) of LED_DUTY i = reading area number |
| tduty[i] | — | Threshold (2) of LED_DUTY |
| areast[i] | — | Cumulative number of times that sduty of LED area is exceeded i = reading area number |
| ust[i] | 15 d, 30 d, 15 d, 30 d, 150 d, 30 d, 15 d, 30 d, 15 d | Upper limit value of areast[i] i = reading area number |
| lst[i] | 2 d, 15 d, 2 d, 15 d, 130 d, 15 d, 2 d, 15 d, 2 d | Lower limit value of areast[i] i = reading area number |
| GSPoint | 4095 d | Upper limit value of LED_DUTY |
| minduty | 300 d | Lower limit value of LED_DUTY |

TABLE 1-continued

| Variable name | Initial value | Meaning |
| --- | --- | --- |
| cduty | 200 d | Change amount of LED_DUTY |
| ctime | 2 d | Lead interval [second] of LED_DUTY |

In the table 1, the areaid indicates an LED area block address. That is, the areaid indicates an address (arrangement position) of an LED area (LED_DUTY reading area 93) in the backlight 9 corresponding to each of the parts of the liquid crystal panel 7. LED areas in the backlight 9 corresponding to the parts of the liquid crystal panel 7 are illustrated in FIG. 4. FIG. 4 illustrates, as an example, a case where a plurality of LEDs arranged in a two-dimensional manner are divided into LED areas of six in a horizontal direction and ten in a vertical direction. Among the LED areas of six in the horizontal direction and ten in the vertical direction, twelve LED areas illustrated in FIG. 4 are the LED_DUTY reading areas 93.

In the table 1, the rduty indicates a value read from the LED_DUTY of the LED_DUTY reading area 93 specified by the areaid.

In the table 1, the sduty[i] indicates a threshold (second threshold) of the LED_DUTY, and i indicates a reading area number.

In the table 1, the tduty[i] indicates another threshold (third threshold) of the LED_DUTY, and i indicates a reading area number.

In the table 1, the areast[i] indicates a cumulative number of times that the sduty of the LED_DUTY reading area 93 is exceeded, and i indicates a reading area number.

In the table 1, the ust[i] indicates an upper limit value of the areast[i], and i indicates a reading area number.

In the table 1, the 1st[i] indicates a lower limit value of the areast[i], and i indicates a reading area number.

In the table 1, the GSPoint indicates an upper limit value of the LED_DUTY.

In the table 1, the minduty indicates a lower limit value of the LED_DUTY.

In the table 1, the cduty indicates a change amount of the LED_DUTY.

In the table 1, the ctime indicates a lead interval (second) of the LED_DUTY.

Figure 5:
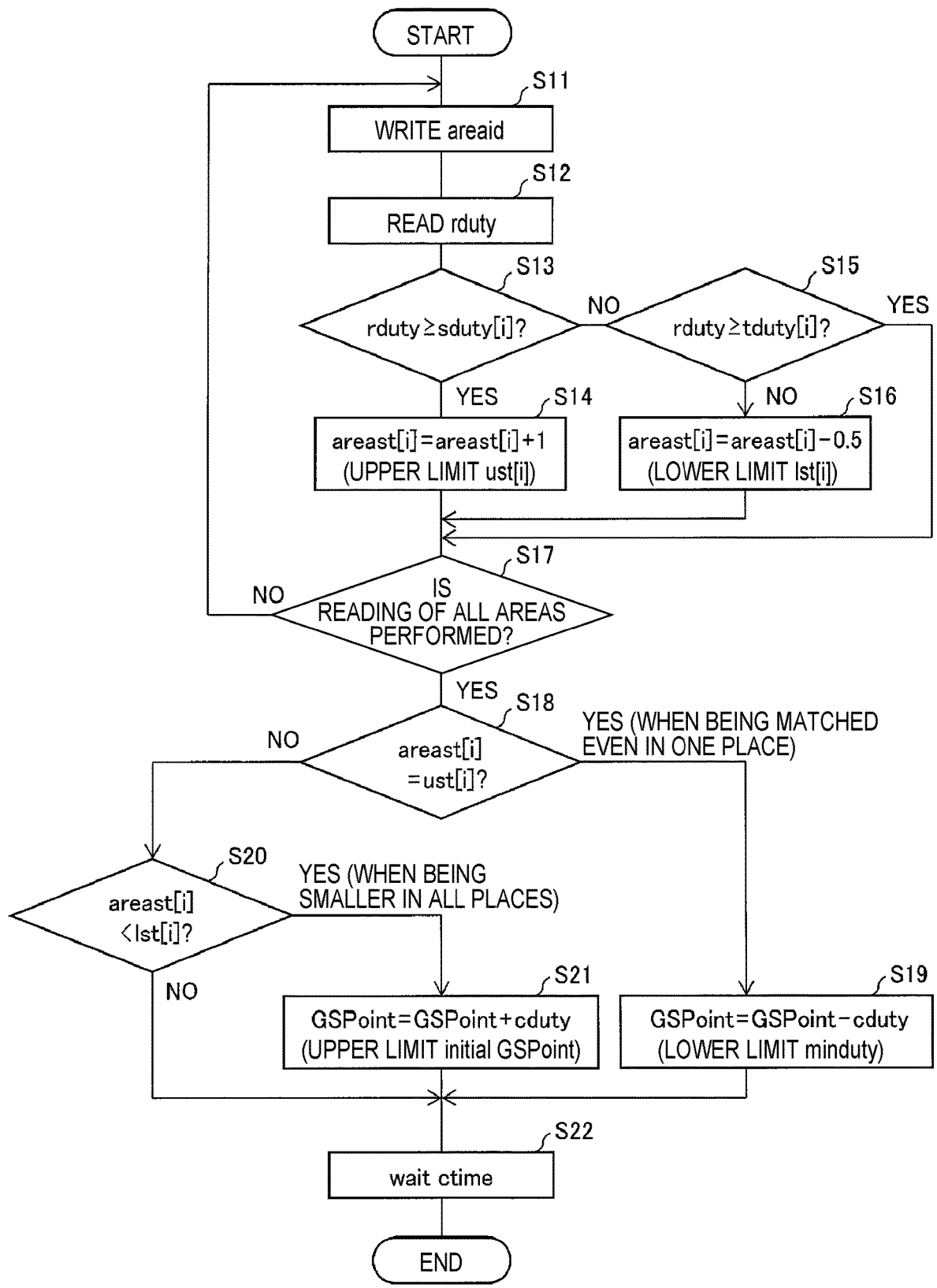
FIG. 5 is a flowchart illustrating a flow of processing of LED_DUTY control in the liquid crystal display device illustrated in FIG. 1.

First, as illustrated in FIG. 5, the areaid is written (step S11). Here, an address of one LED_DUTY reading area 93 of all the LED areas of the backlight 9 is written in the microcomputer 81.

Subsequently, the LED_DUTY of the LED_DUTY reading area 93 specified by the areaid written at step S11 is read (step S12).

Next, whether or not a reading value (rduty) of the LED_DUTY, which is obtained at step S11, is equal to or more than the sduty (which is able to be set to any value) that is set for each of the LED_DUTY reading areas 93 is determined (step S13).

When the reading value (rduty) of the LED_DUTY is equal to or more than the sduty at step S13, the procedure shifts to step S14, and when the reading value is less than the sduty, the procedure shifts to step S15.

At step S14, the cumulative number (areast) is incremented. Here, the cumulative number (areast) is incremented by "1".

At step S15, whether or not the reading value (rduty) of the LED_DUTY is equal to or more than the tduty (which is able to be set to any value) that is set for each of the LED_DUTY reading areas 93 is determined. When the reading value (rduty) of the LED_DUTY is less than the tduty, the procedure shifts to step S16, and when the reading value (rduty) of the LED_DUTY is equal to or more than the tduty, the procedure shifts to step S17.

At step S16, the cumulative number (areast) is decremented. Here, the cumulative number (areast) is decremented by "0.5".

After that, whether or not reading of all the areas (areas) is completed is determined (step S17). Here, the processing of step S11 to step S16 is repeated until it is determined that reading of all the areas (areas) is completed, and when it is determined that reading of all the areas (areas) is completed, the procedure shifts to step S18.

At step S18, whether or not the cumulative number (areast) matches an upper limit value (ust: which is able to be set to any value) that is preset for each of the LED_DUTY reading areas 93 is determined. When it is determined that the cumulative number (areast) matches the upper limit value (ust) even in one place of the LED_DUTY reading area 93 of all the LED_DUTY reading areas 93, the procedure shifts to step S19, and when it is determined that the cumulative number (areast) does not match the upper limit value (ust) in all the LED_DUTY reading areas 93 (all places), the procedure shifts to step S20.

At step S19, the GSPoint (upper limit value of the LED_DUTY) is reduced. Specifically, a value obtained by subtracting a preset change amount (cduty) from the GSPoint is set as a new GSPoint and the procedure shifts to step S22.

At step S20, whether or not the areast is smaller than a lower limit value (1st: which is able to be set to any value) that is preset for each of the LED_DUTY reading areas 93 is determined. When it is determined that the areast is smaller than the lower limit value (1st) in all the LED_DUTY reading areas 93 (all places), the procedure shifts to step S21, and when it is determined that the areast is equal to or more than the lower limit value (1st) even in one place of the LED_DUTY reading area 93 of all the LED_DUTY reading areas 93, the procedure shifts to step S22.

At step S21, the GSPoint (upper limit value of the LED_DUTY) is increased. Specifically, a value obtained by adding a preset change amount (cduty) to the GSPoint is set as a new GSPoint and the procedure shifts to step S22.

At step S22, after waiting until next reading of the LED_DUTY is performed by the drive IC 82, the processing from step S11 to step S21 is performed again. In this manner, the processing described above is repeated.

The processing described above is performed in the backlight driving control unit 8.

When the LED_DUTY output in step S19 of the processing illustrated in FIG. 5, that is, the LED_DUTY from which the upper limit value is subtracted is input to the driver IC 82, the backlight driving control unit 8 performs control to reduce the power supplied to the backlight 9. When the LED_DUTY output in step S21 of the processing illustrated in FIG. 5, that is, the LED_DUTY to which the upper limit value is added is input to the driver IC 82, the backlight driving control unit 8 performs control to increase the power supplied to the backlight 9, to the contrary.

<Power Reduction Processing>

Here, when the LED_DUTY output in step S19 of the processing illustrated in FIG. 5, that is, the LED_DUTY from which the upper limit value is subtracted is input to the driver IC 82, the backlight driving control unit 8 performs control to reduce the power supplied to the backlight 9.

An effect of the control by the backlight driving control unit 8 will be described below with reference to FIG. 6.

Figure 6:
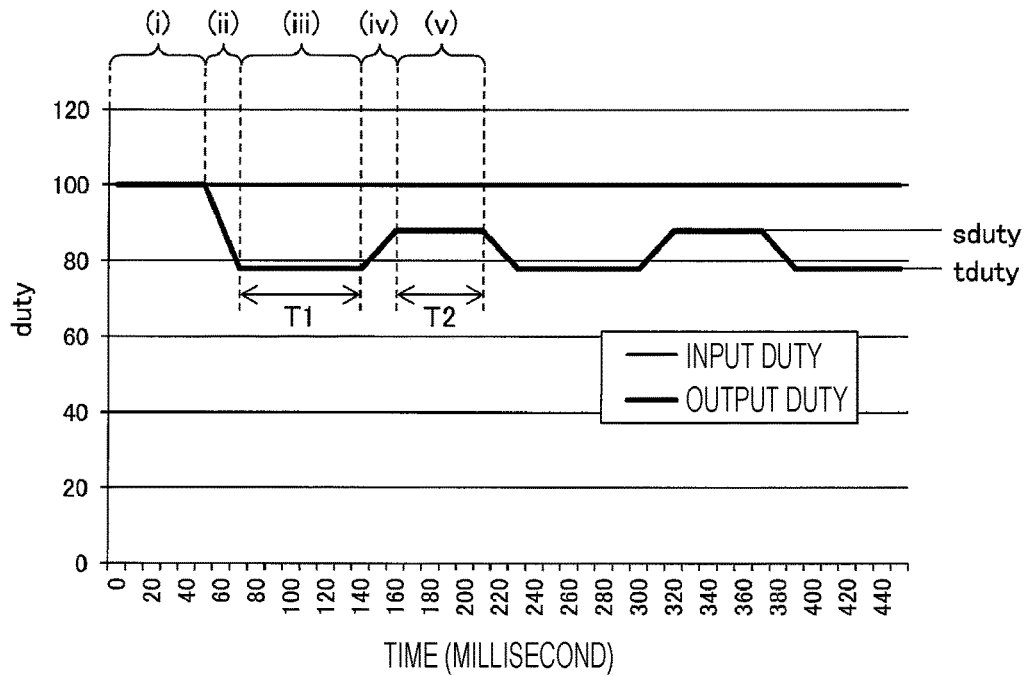
FIG. 6 is a graph for explaining LED_DUTY control in the liquid crystal display device illustrated in FIG. 1.

FIG. 6 is a graph illustrating a relationship between the LED_DUTY (input duty of FIG. 6) before being subjected to the control by the backlight driving control unit 8 and the LED_DUTY (output duty of FIG. 6) subjected to the control by the backlight driving control unit 8. In FIG. 6, a horizontal axis of the graph indicates a time and a vertical axis of the graph indicates the LED_DUTY, and a value of the LED_DUTY that is output by being subjected to the control by the backlight driving control unit 8 when the LED_DUTY "100" is continuously input as the input duty is indicated.

A state indicated by (i) in FIG. 6 is a state where no control is performed and is a state where an input duty value "100" is an output duty value. The state indicated by (i) in FIG. 6 is a state where the cumulative number (areast) is increased and is a state where the cumulative number (areast) is increased by repeating step S11 to step S17 until the cumulative number (areast) reaches the upper limit value (ust).

Next, when the cumulative number (areast) reaches the upper limit value (ust) (YES at step S18), a state indicated by (ii) in FIG. 6 starts. The state indicated by (ii) in FIG. 6 is a state where a new GSPoint obtained by subtracting a change amount (cduty) from the GSPoint is set (step S19) and the output duty is reduced. The state indicated by (ii) in FIG. 6 is repeated until the reading value (rduty) of the LED_DUTY becomes smaller than the tduty.

Then, when the reading value of the LED_DUTY becomes smaller than the tduty, a state indicated by (iii) in FIG. 6 starts. The state indicated by (iii) in FIG. 6 is a state where the cumulative number (areast) is reduced. The state indicated by (iii) in FIG. 6 is repeated until the cumulative number (areast) becomes smaller than the lower limit value (1st) in all the places.

When the cumulative number (areast) becomes smaller than the lower limit value (1st) in all the places, a state indicated by (iv) in FIG. 6 starts. In the state indicated by (iv) in FIG. 6, a new GSPoint obtained by adding a change amount (cduty) to the GSPoint is set (step S19). The state indicated by (iv) in FIG. 6 is repeated until the reading value (rduty) of the LED_DUTY reaches the sduty.

Then, when the reading value (rduty) of the LED_DUTY reaches the sduty, a state indicated by (v) in FIG. 6 starts. The state indicated by (v) in FIG. 6 is a state where the output duty is kept at the sduty. The state indicated by (v) in FIG. 6 is a state where the cumulative number (areast) is increased. The state indicated by (v) in FIG. 6 continues until the cumulative number (areast) reaches the upper limit value (ust).

When the cumulative number (areast) reaches the upper limit value (ust), a new GSPoint obtained by subtracting a change amount (cduty) from the GSPoint is set (step S19) and a state where the output duty is reduced is brought, and the aforementioned state indicated by (ii) in FIG. 6 starts. Subsequently, the aforementioned states of (iii) to (v) in FIG. 6 are repeated as long as the input duty is "100".

In the present embodiment 1, in step S14 at which the cumulative number (areast) is increased, an increment value is "1". On the other hand, a decrement value in step S16 is "0.5". In this manner, in the present embodiment 1, the value by which the cumulative number (areast) is decremented is set to be smaller than the value by which the cumulative number (areast) is incremented. Thereby, a time (lighting period) (T1 in FIG. 6) required until the cumulative number (areast) becomes smaller than the lower limit value (1st) is longer than a time (lighting period) (T2 in FIG. 6) required until the cumulative number (areast) reaches the upper limit value (ust). This makes it possible to effectively suppress temperature rising of the backlight 9.

Figure 7:
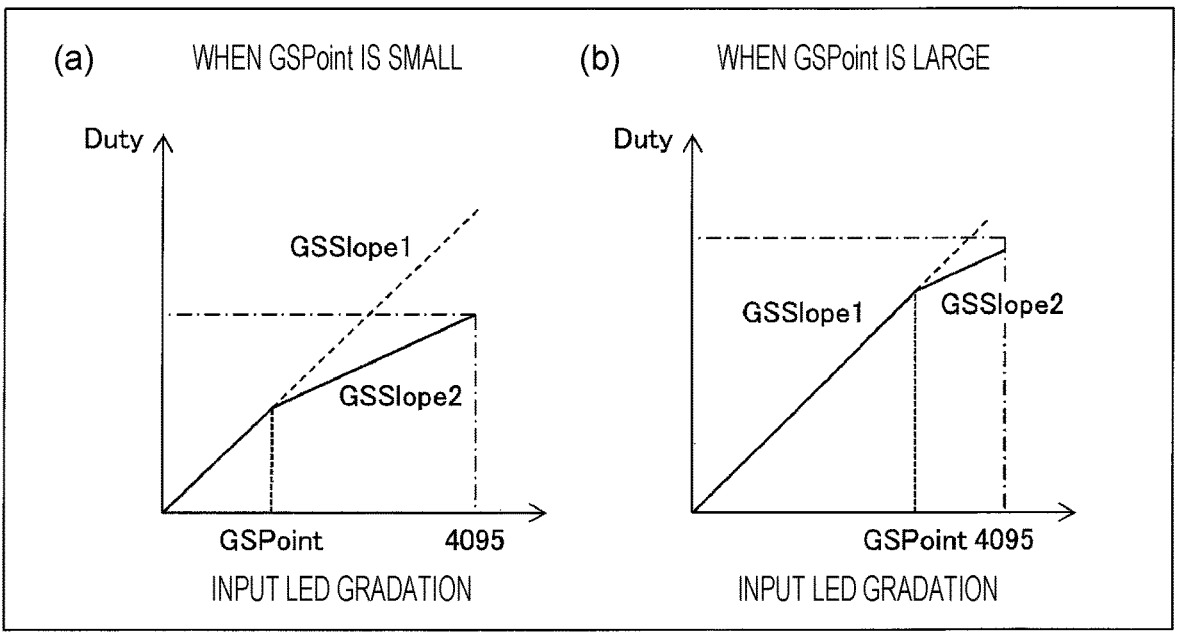
FIG. 7 is a graph for explaining LED_DUTY control in the liquid crystal display device illustrated in FIG. 1.

FIG. 7 illustrates a relationship between input LED gradation (input duty) and output LED gradation (output duty) when the GSPoint is smaller than the upper limit value (for example, maximum gradation 4095). FIG. 7(*a*) illustrates a case where the GSPoint is smaller than that of FIG. 7(*b*). As described above, when the cumulative number (areast) reaches the upper limit value (ust), the GSPoint is reduced to thereby reduce the output duty. Also when the output duty is increased, similarly, the GSPoint is increased to thereby increase the output duty. Here, the GSPoint remains to be the upper limit value (ust) when no control is performed, but when the control is performed, GSSlope2 indicated in FIGS. 7(*a*) and 7(*b*) is generated while the GSPoint is reduced (while being not 4095 of the upper limit value), and the output LED gradation (output duty) subjected to the control is output (vertical axis) with respect to the input LED gradation (input duty) indicated by the horizontal axis. Note that, an inclination of the GSSlope2 is able to be set to any inclination.

According to the liquid crystal display device 10 of the present embodiment 1 that includes the backlight driving control unit 8 performing the power reduction processing described above, it is possible to effectively perform control with less load compared to a case where temperature is always monitored. In this manner, by dynamically controlling temperature rising of the LED, it is possible to suppress reduction in light emission efficiency and lifetime of the LED.

It is also possible to reduce temperature rising of a semiconductor device (such as the driver IC 82) in an LED driving circuit (backlight driving control unit 8).

Additionally, since a temperature sensor is not necessary, the liquid crystal display device is able to be constructed inexpensively.

According to the liquid crystal display device 10 of the present embodiment 1, for dynamically controlling temperature rising of the LED, not only one but two thresholds (sduty and tduty) of the LED_DUTY are defined. This makes it possible to suppress a level of the current reduction to the minimum. Thus, it is possible to suppress reduction of luminance of an actual video and sufficiently utilize merit of control by a high dynamic range (HDR) system.

Note that, in the present embodiment 1, though the value by which the cumulative number (areast) is incremented at step S14 is "1" and the value by which the cumulative number (areast) is decremented at step S16 is "0.5", the invention is not limited to the values and the values are able to be set to any values. By changing setting of the numerical values, it is possible to adjust a time during which the duty is reduced and a time during which the duty is increased. This provides a margin of the temperature, so that the thresholds (sduty and tduty) of the LED_DUTY are able to be set to be generally high accordingly. That is, it is possible to minimize the reduction of the luminance even when current control is performed.

Note that, in the present embodiment 1, description has been given by taking the entire liquid crystal display device 10 including not only the control device 50 but also the liquid crystal panel 7, the backlight 9, and the like. However, the invention is not limited thereto and may be a control device having the control device 50 described above as an aspect.

That is, an aspect of the invention may be, in other words, the control device 50 that controls the liquid crystal panel 7, and the backlight 9 which is arranged on the rear surface side of the liquid crystal panel 7 and has a plurality of LEDs, and the control device 50 includes the display control unit 4 that generates, from average luminance and luminance distribution of images for one frame calculated from a video signal, display data used for driving the liquid crystal panel 7 and backlight control data used for driving the backlight 9, and the backlight driving control unit 8 that drives, on the basis of the backlight control data, the respective LEDs to be turned on by PWM control, detects a duty ratio of an LED arranged on a preset pattern among the plurality of LEDs, and controls power, which is supplied to be backlight 9, in accordance with the detected duty ratio of the LED, in which when determining that the average luminance is equal to or less than the preset first threshold and the video signal includes a high gradation signal of a fixed value or more from the luminance distribution, the display control unit 4 outputs a result of the determination to the backlight driving control unit 8, and upon reception of the result of the determination from the display control unit 4, when the detected duty ratio of the LED is equal to or more than the preset second threshold (sduty) for a fixed time, the backlight driving control unit 8 performs control to reduce the power supplied to the backlight 9, and when the detected duty ratio of the LED is less than the preset third threshold (tduty) for a fixed time different from the fixed time described above, the backlight driving control unit 8 performs control to increase the power supplied to the backlight 9, and performs control so that the time T1 during which the power supplied to the backlight 9 is reduced is longer than the time T2 during which the power supplied to the backlight is increased.

Note that, the invention is not limited to the LED as long as being a conventionally known light source that may be included in a backlight. In the invention, adjustment of brightness of the LED of the backlight is achieved by changing the duty, but adjustment of brightness is not limited thereto.

Embodiment 2

Another embodiment of the invention will be described as follows with reference to FIG. 8. Note that, for convenience of description, a member having the same function as that of the member described in the embodiment 1 will be given the same reference sign and description thereof will be omitted.

The present embodiment 2 and the embodiment 1 described above are different only in a content of LED_DUTY control, specifically, a content of power reduction processing of the backlight driving control unit 8 and are the same in the others.

The LED_DUTY control of the liquid crystal display device of the present embodiment 2 will be described below with reference to a flowchart illustrated in FIG. 8. Note that, among parameters described in the flowchart illustrated in FIG. 8, ones that are not in the table 1 will be indicated in a table 2.

TABLE 2

| Variable name | Initial value | Meaning |
|---|---|---|
| counter[i] | — | Cumulative number in which LED_DUTY is input duty i = reading area number |
| α | — | Value by which areast is incremented |
| β | — | Value by which areast is incremented |

In the table 2, the counter[i] indicates a cumulative number (hereinafter, described as a counter value) in which a reading value (rduty) of the LED_DUTY is the input duty, and i indicates a reading area number.

In the table 2, α indicates a value by which the cumulative number (areast) of times that the sduty of the LED_DUTY reading area 93 is exceeded is incremented.

In the table 2, β indicates a value by which the cumulative number (areast) of times that the sduty of the LED_DUTY reading area 93 is exceeded is incremented.

Figure 8:
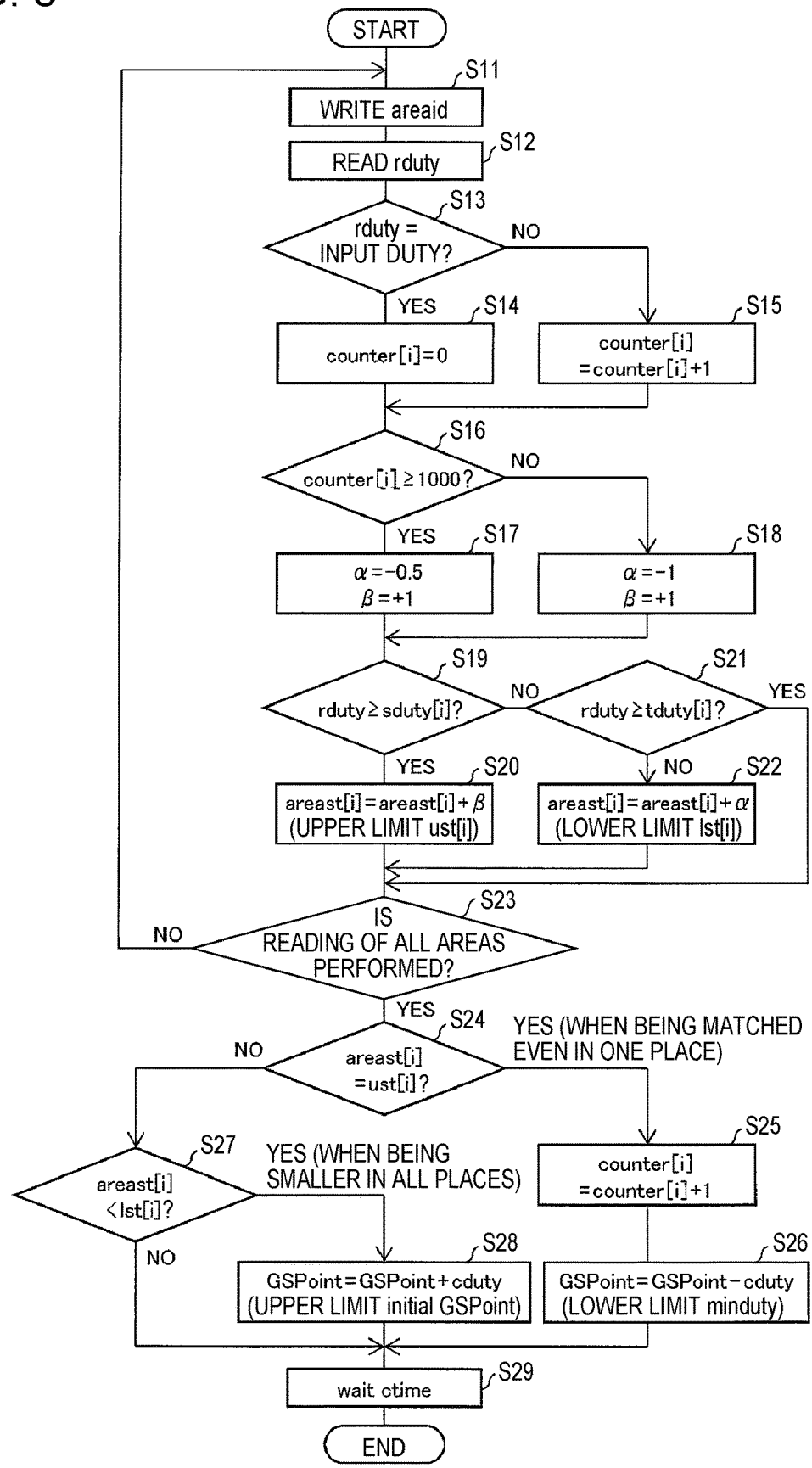
FIG. 8 is a flowchart illustrating a flow of processing of LED_DUTY control in a liquid crystal display device according to another embodiment of the invention.

To describe the flowchart illustrated in FIG. 8, first, step S11 and step S12 of FIG. 8 are step S11 and step S12 of FIG. 5 of the embodiment 1.

Next, whether or not the reading value (rduty) of the LED_DUTY, which is obtained at step S11, is the same as the duty (input duty) that is actually input (step S13). Thereby, whether or not to be a state where control is performed is determined. When the reading value (rduty) of the LED_DUTY is the same as the input duty, the procedure shifts to step S14, and when they are not the same, the procedure shifts to step S15.

At step S14, the counter value (counter) is set to 0.

At step S15, the counter value (counter) is incremented. Here, the counter value (counter) is incremented by "1".

At step S16, whether or not a value that is preset to the counter (counter) is "1000" or more is determined. When the value of the counter (counter) is 1000 or more, the procedure shifts to step S17, and when the value of the counter (counter) is less than 1000, the procedure shifts to step S18.

At step S17, α=−0.5 and β=+1 are set.

At step S18, α=−1 and β=+1 are set.

Step S19 is the same as step S13 of the embodiment 1 and whether or not the reading value (rduty) of the LED_DUTY, which is obtained at step S11, is equal to or more than the sduty that is set for each of the LED_DUTY reading areas 93 is determined.

When the reading value (rduty) of the LED_DUTY is equal to or more than the sduty at step S19, the procedure shifts to step S20, and when the reading value is less than the sduty, the procedure shifts to step S21.

At step S20, the cumulative number (areast) is incremented. Here, the cumulative number (areast) is incremented by the value of a that is set at step S17 or step S18. This may be represented that an absolute value of a is decremented when a has a negative value.

At step S21, whether or not the reading value (rduty) of the LED_DUTY is equal to or more than the tduty that is set for each of the LED_DUTY reading areas 93 is determined. When the reading value (rduty) of the LED_DUTY is less than the tduty, the procedure shifts to step S22, and when the reading value (rduty) of the LED_DUTY is equal to or more than the tduty, the procedure shifts to step S23.

At step S22, the cumulative number (areast) is incremented. Here, the cumulative number (areast) is incremented by the value of β that is set at step S17 or step S18.

After that, whether or not reading of all the areas (areas) is completed is determined (step S23). Here, the processing of step S11 to step S22 is repeated until it is determined that reading of all the areas (areas) is completed, and when it is determined that reading of all the areas (areas) is completed, the procedure shifts to step S24.

At step S24, in the same manner as step S18 of FIG. 5 of the embodiment 1, whether or not the cumulative number (areast) matches an upper limit value (ust: which is able to be set to any value) that is preset for each of the LED_DUTY reading areas 93 is determined. When it is determined that the cumulative number (areast) matches the upper limit value (ust) even in one place of the LED_DUTY reading area 93, the procedure shifts to step S25, and when it is determined that the cumulative number (areast) does not match the upper limit value (ust) in all the places, the procedure shifts to step S27.

At step S25, the counter value (counter) is incremented. Here, the counter value (counter) is incremented by "1".

At step S26, the GSPoint (upper limit value of the LED_DUTY) is reduced. Specifically, a value obtained by subtracting a preset change amount (cduty) from the GSPoint is set as a new GSPoint and the procedure shifts to step S29.

At step S27, in the same manner as step S20 of FIG. 5 of the embodiment 1, whether or not the areast is smaller than a lower limit value (1st: which is able to be set to any value) that is preset for each of the LED areas is determined. When it is determined that the areast is smaller than the lower limit value (1st) in all the places, the procedure shifts to step S28, and when it is determined that the areast is equal to or more than the lower limit value (1st) even in one place, the procedure shifts to step S29.

At step S28, in the same manner as step S21 of FIG. 5 of the embodiment 1, the GSPoint (upper limit value of the LED_DUTY) is increased. Specifically, a value obtained by adding a preset change amount (cduty) to the GSPoint is set as a new GSPoint and the procedure shifts to step S29.

At step S29, after waiting until next reading of the LED_DUTY is performed by the drive IC 82, the processing from step S11 to step S28 is performed again. In this manner, the processing described above is repeated.

The processing described above is performed in the backlight driving control unit 8.

Figure 9:
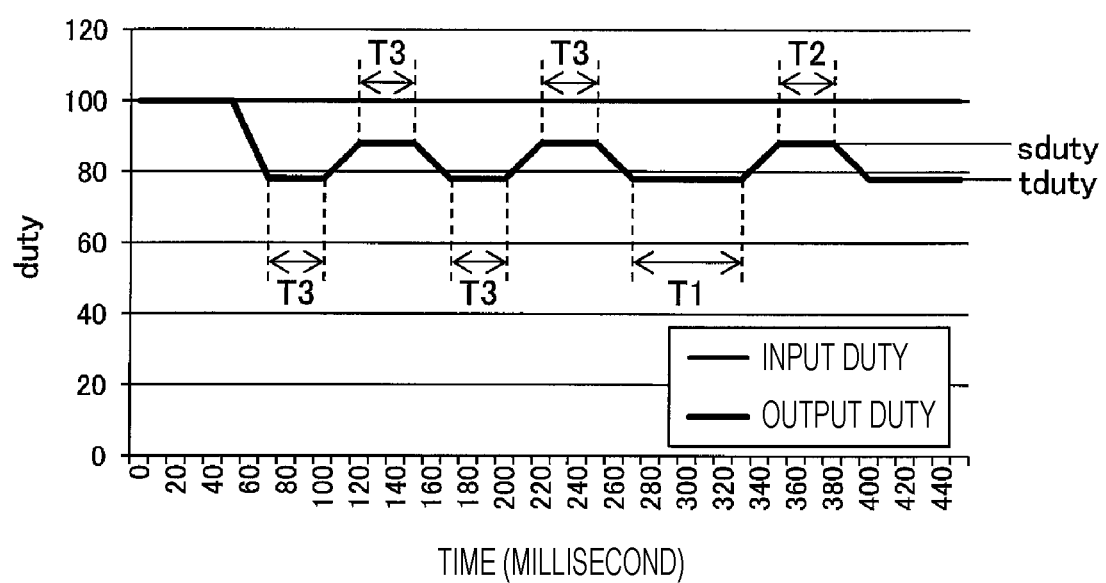
FIG. 9 is a graph for explaining LED_DUTY control in the liquid crystal display device of FIG. 8.

FIG. 9 is a graph illustrating a relationship between the LED_DUTY (input duty of FIG. 9) before being subjected to the control by the backlight driving control unit 8 and the LED_DUTY (output duty of FIG. 9) subjected to the control by the backlight driving control unit 8. In FIG. 9, a horizontal axis of the graph indicates a time and a vertical axis of the graph indicates the LED_DUTY, and a value of the LED_DUTY that is output by being subjected to the control by the backlight driving control unit 8 when the LED_DUTY "100" is continuously input as the input duty is indicated.

As illustrated in FIG. 9, according to the present embodiment 2, for a while after the control of the LED_DUTY starts, the temperature has a margin, so that a time during which the duty is reduced is made equal to a time during which the duty is increased (T3 of FIG. 9), and after the counter value (counter) reaches a fixed level ("1000" in the present embodiment 2), that is, at a stage where the temperature rises after a fixed time has lapsed, the time (T1 of FIG. 9) during which the duty is reduced is made longer than the time (T2 of FIG. 9) during which the duty is increased. This provides a margin of the temperature, so that the sduty and the tduty are able to be set to be generally high accordingly. That is, it is possible to minimize the reduction of the luminance even when current control is performed. Note that, lengths of the time T2 and the time T3 of FIG. 9 may be equal or different.

Note that, numerical values of $\alpha$ and $\beta$ are variable, and the determination at step S16 may be performed by providing three or more sections in the parameter ("1000" in the example of FIG. 8) used for the determination. For example, as an initial stage, when the counter value (counter) is equal to or less than 500, $\alpha=-1$ and $\beta=+1$ may be set, as a middle stage, when the counter value (counter) exceeds 500 and is less than 1000, $\alpha=-0.5$ and $\beta=+1$ may be set, and as a later stage, when the counter value (counter) is 1000 or more, $\alpha=-0.5$ and $\beta=+1.5$ may be set.

Thereby, it is possible that the time during which the duty is reduced is made equal to the time during which the duty is increased when the temperature has a margin in the initial stage, the time during which the duty is reduced is made slightly longer than the time during which the duty is increased when the temperature rises in the middle stage, and the time during which the duty is reduced is made further longer when the temperature further rises in the later stage. Even when three or more sections are provided in this manner, the temperature has a margin and the sduty and the tduty are able to be set to be generally high.

Embodiment 3

Another embodiment of the invention will be described as follows with reference to FIGS. 10 to 13. Note that, for convenience of description, a member having the same function as that of the member described in the embodiment 2 will be given the same reference sign and description thereof will be omitted.

<Configuration of Liquid Crystal Display Device 10A>

Figure 10:
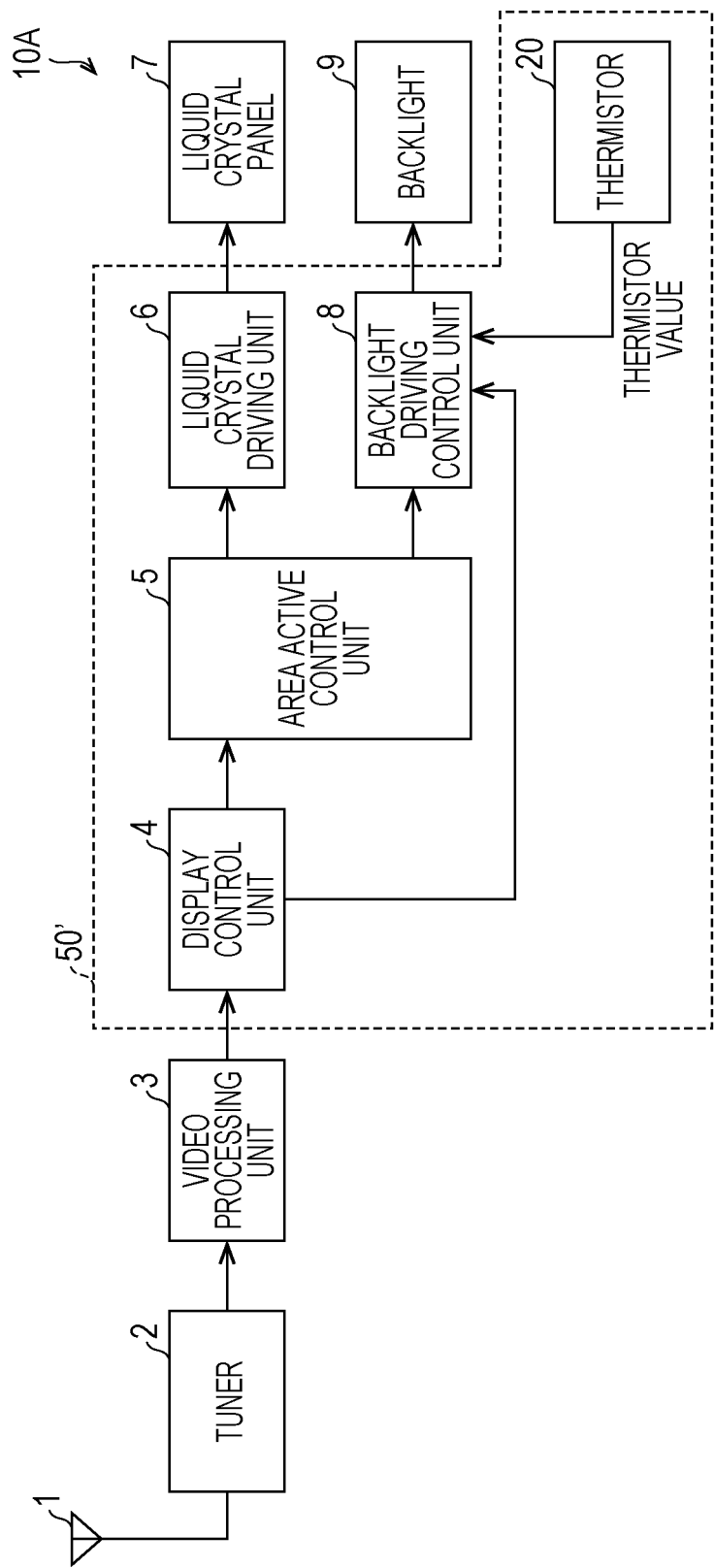
FIG. 10 is a block diagram illustrating a schematic configuration of a liquid crystal display device according to another embodiment of the invention.

FIG. 10 is a block diagram illustrating a schematic configuration of a liquid crystal display device 10A according to the present embodiment 3.

The liquid crystal display device 10A illustrated in FIG. 10 has a configuration obtained by adding a thermistor 20 to the liquid crystal display device 10 illustrated in FIG. 1 of the embodiment 1 described above. Thus, detailed description for members other than the thermistor 20 and members related to the thermistor 20 will be omitted. Note that, the thermistor 20 is constituted in a control device 50' with the display control unit 4, the area active control unit 5, the liquid crystal driving unit 6, and the backlight driving control unit 8.

In LED_DUTY control of the liquid crystal display device 10A of the present embodiment 3, a temperature around the LED unit 92 and a temperature in a housing of the backlight 9 are referred to with use of the thermistor 20 and a reduction amount of the duty, that is, the tduty is adjusted by values of the temperatures.

Figure 11:
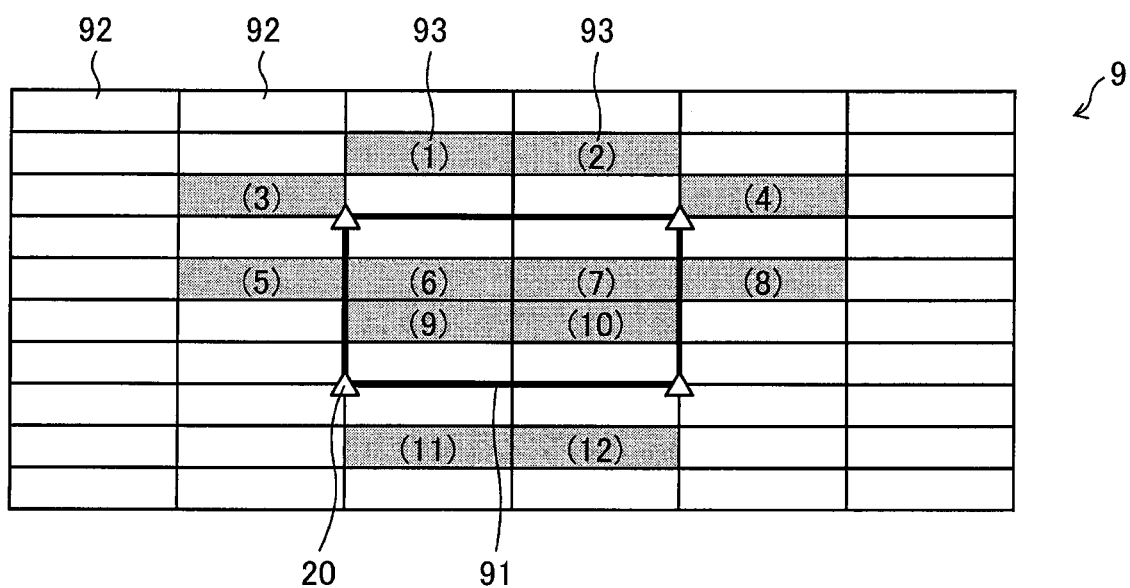
FIG. 11 illustrates a detailed configuration of a part of the liquid crystal display device illustrated in FIG. 10.

FIG. 11 illustrates an arrangement example of thermistors 20. FIG. 11 illustrates an example in which the thermistors 20 are arranged in four corners near a center part of the backlight 9. Note that, arrangement positions of the thermistors 20 are not particularly limited.

Detection values of the thermistors 20 are transmitted to the backlight driving control unit 8.

<LED_DUTY Control>

The LED_DUTY control of the liquid crystal display device 10A of the present embodiment 3 will be described below with reference to a flowchart illustrated in FIG. 12. Note that, among parameters described in the flowchart illustrated in FIG. 12, ones that are not in the table 1 or the table 2 will be indicated in a table 3.

TABLE 3

| Variable name | Initial value | Meaning |
| --- | --- | --- |
| rtemp | — | Thermistor reading value |
| htemp | 211 d | Upper limit value of temperature, Temperature threshold (1) |
| ltemp | 178 d | Lower limit value of temperature, Temperature threshold (2) |
| hcduty | 4095 d | Change amount (1) of LED_DUTY |
| mcduty | 300 d | Change amount (2) of LED_DUTY |
| lcduty | 200 d | Change amount (3) of LED_DUTY |
| γ | — | Change amount of LED_DUTY |

In the table 3, the rtemp indicates a reading value of a temperature of the LED_DUTY reading area 93 specified by the areaid.

In the table 3, the htemp indicates a first temperature threshold.

In the table 3, the ltemp indicates a second temperature threshold.

In the table 3, the hcduty indicates a first change amount of the LED_DUTY.

In the table 3, the mcduty indicates a second change amount of the LED_DUTY.

In the table 3, the lcduty indicates a third change amount of the LED_DUTY.

In the table 3, γ indicates a change amount of the LED_DUTY.

Figure 12:
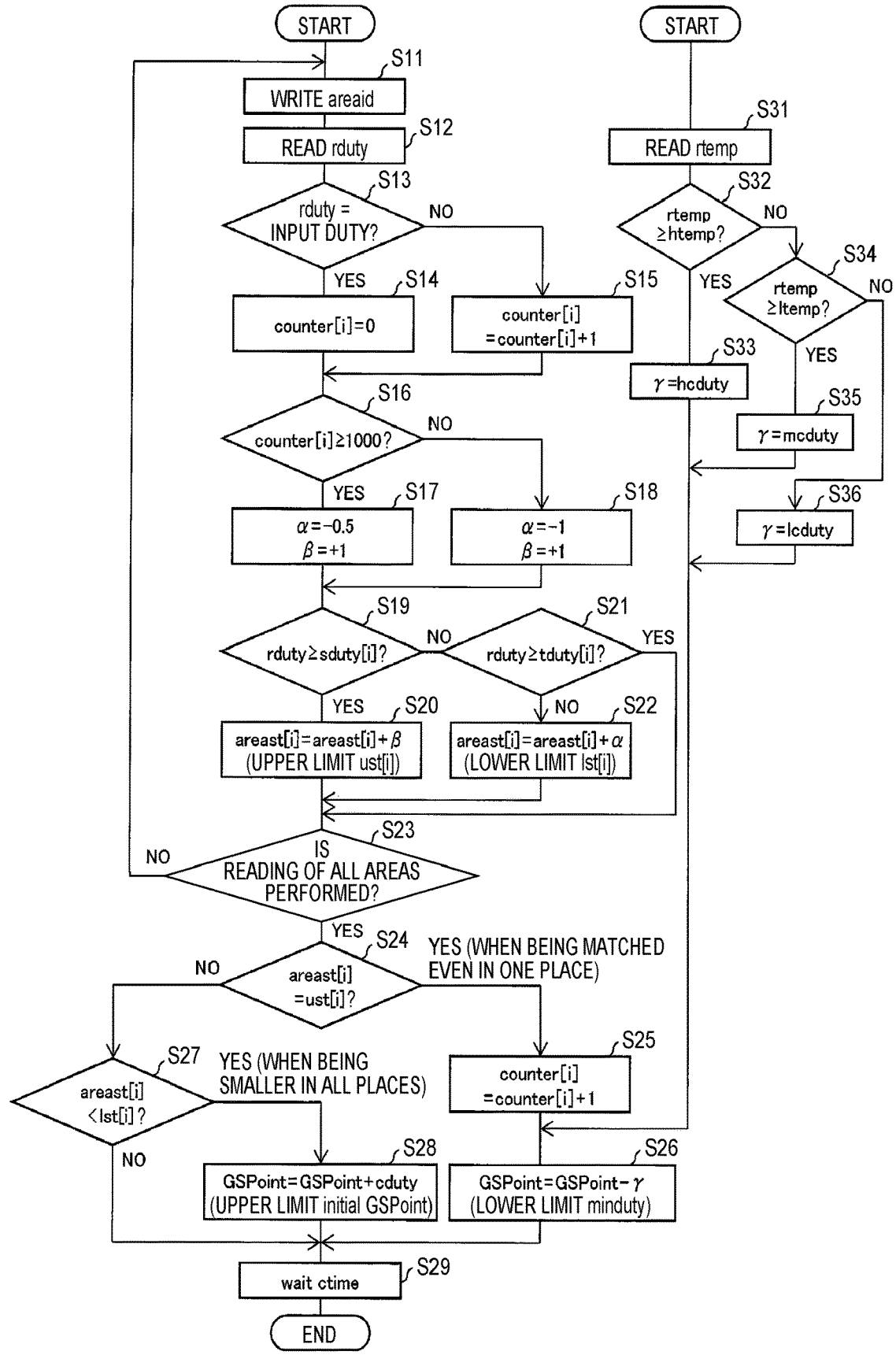
FIG. 12 is a flowchart illustrating a flow of processing of LED_DUTY control in the liquid crystal display device illustrated in FIG. 10.

To describe the flowchart illustrated in FIG. 12, first, step S11 to step S25 of FIG. 12 are step S11 to step S25 of FIG. 8 of the embodiment 2.

At step S26' subsequent to step S25, a change amount (reduction amount) of the LED_DUTY, which is obtained on the basis of the flow along step S30 to step S36 illustrated in FIG. 12, is used.

Then, the flow along step S30 to step S36 illustrated in FIG. 12 will be described below.

First, as illustrated in FIG. 12, a thermistor value (measurement value) is read (step S31).

Next, at step S32, whether or not the thermistor value (rtemp) that is read is equal to or more than the first temperature threshold (htemp) that is preset is determined. Here, the first temperature threshold (htemp) is able to be set to any value and is a value of a relatively high temperature. When the thermistor value (rtemp) is equal to or more than the first temperature threshold (htemp) at step S32, the procedure shifts to step S33, and when the thermistor value is less than the first temperature threshold (htemp), the procedure shifts to step S34.

At step S33, γ=hcduty is set.

At step S34, whether or not the thermistor value (rtemp) that is determined to be less than the first temperature threshold (htemp) at step S32 in a previous stage is equal to or more than the second temperature threshold (ltemp) is determined. Here, the second temperature threshold (ltemp) is able to be set to any value and is a value of a temperature lower than that of the first temperature threshold (htemp). When the thermistor value (rtemp) is equal to or more than the second temperature threshold (ltemp) at step S34, the procedure shifts to step S35, and when the thermistor value is less than the second temperature threshold (ltemp), the procedure shifts to step S36.

At step S35, γ=mcduty (first) is set.

At step S36, γ32 lcduty is set.

At step S26', the GSPoint (upper limit value of the LED_DUTY) is reduced. Specifically, a value obtained by subtracting the value of γ (change amount of the LED_DUTY) obtained at step S33, step S35, or step S36 from the GSPoint is set as a new GSPoint and the procedure shifts to step S29.

Note that, step S27 to step S29 are the same as step S27 to step S29 of the embodiment 2.

The processing described above is performed in the backlight driving control unit 8.

Here, the hcduty (first change amount of the LED_DUTY) set at step S33, the mcduty (second change amount of the LED_DUTY) set at step S35, and the lcduty (third change amount of the LED_DUTY) set at step S36 satisfy the following relation; hcduty>mcduty>lcduty. That is, as the thermistor value (rtemp) indicates a higher temperature, the reduction amount of the LED_DUTY is increased.

Figure 13:
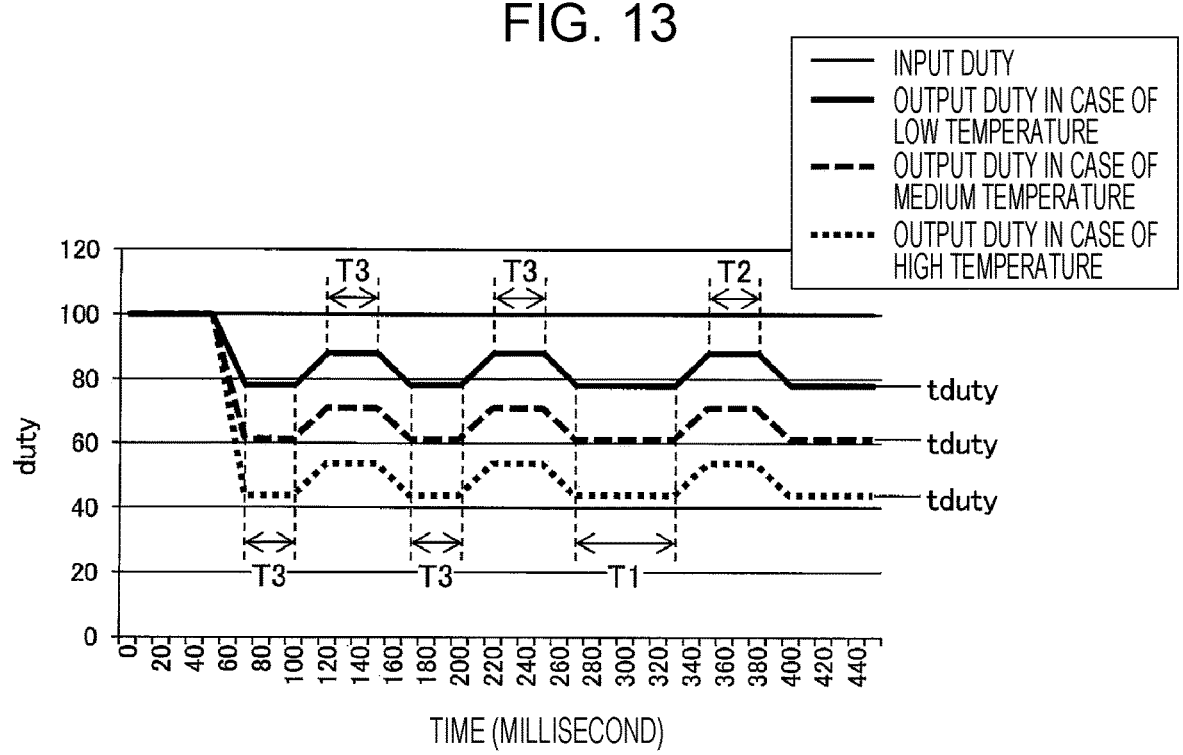
FIG. 13 is a graph for explaining LED_DUTY control in the liquid crystal display device illustrated in FIG. 10.

FIG. 13 is a graph illustrating a relationship between the LED_DUTY (input duty of FIG. 13) before being subjected to the control by the backlight driving control unit 8 and the LED_DUTY (three types of output duties of FIG. 13) subjected to the control by the backlight driving control unit 8. In FIG. 13, a horizontal axis of the graph indicates a time and a vertical axis of the graph indicates the LED_DUTY, and a value of the LED_DUTY that is output by being subjected to the control by the backlight driving control unit 8 when the LED_DUTY "100" is continuously input as the input duty is indicated.

As illustrated in FIG. 13, according to the present embodiment 3, thermistor values are classified into three ranks and a degree of the reduction amount of the output duty is set in accordance with each of the ranks. That is, the tduty of the output duty is set in accordance with the rank. Note that, the sduty of the output duty is set so that an increase amount from the tduty is equal among the ranks.

In this manner, in the LED_DUTY control of the liquid crystal display device 10A of the present embodiment 3, by differentiating the reduction amount of the luminance in accordance with a peripheral temperature, it is possible to perform luminance control more finely.

Note that, in FIG. 13 of the present embodiment 3, similarly to FIG. 9 of the embodiment 2, a time during which the luminance is reduced after a certain time has lapsed from start of the control is set to be longer than a time during which the luminance is increased. However, the invention is not limited thereto, and setting of the reduction amount of the luminance according to the thermistor value (rtemp), which has been described in the embodiment 3, is also able to be adopted in the embodiment 1.

Embodiment 4

Though an aspect in which the reduction amount of the luminance is set in accordance with the thermistor value (rtemp) has been described in the embodiment 3 described above, the LED_DUTY control referring to the thermistor value (rtemp) is not limited to the aspect.

Figure 14:
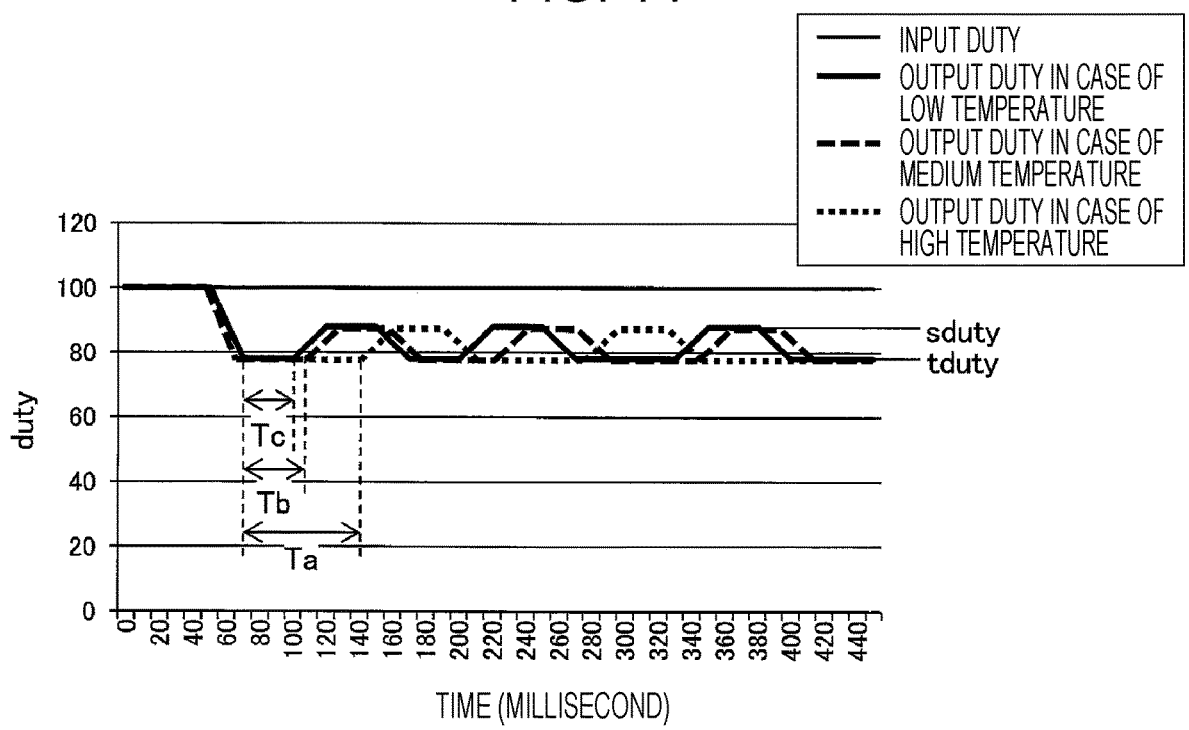
FIG. 14 is a graph for explaining a modified example of LED_DUTY control in the liquid crystal display device illustrated in FIG. 10.

For example, as the present embodiment 4, it is also possible to perform the LED_DUTY control illustrated in FIG. 14 by using the liquid crystal display device 10A described in the embodiment 3. Specifically, in the present embodiment 4, provided is an aspect in which in a case where the thermistor value is low, a time during which the luminance is reduced is made a relatively short time, and in a case where the thermistor value is high, the time during which the luminance is reduced is made a longer time than the case where the thermistor value is low.

FIG. 14 is a graph illustrating a relationship between the LED_DUTY (input duty of FIG. 14) before being subjected to the control by the backlight driving control unit 8 and the LED_DUTY (three types of output duties of FIG. 14) subjected to the control by the backlight driving control unit 8 in the present embodiment 4. In FIG. 14, a horizontal axis of the graph indicates a time and a vertical axis of the graph indicates the LED_DUTY, and a value of the LED_DUTY that is output by being subjected to the control by the backlight driving control unit 8 when the LED_DUTY "100" is continuously input as the input duty is indicated.

As illustrated in FIG. 14, according to the present embodiment 4, thermistor values are classified into three ranks and a time during which the output duty is reduced is set in accordance with each of the ranks. That is, when the thermistor value is high, that is, indicates a high temperature, a time during which the output duty is the tduty is made long (time Ta in FIG. 14) in order to reduce the temperature. Moreover, when the thermistor value is not too high and not too low, that is, indicates a medium temperature, the time during which the output duty is the tduty is made shorter than the case of the high temperature (time Tb in FIG. 14). Moreover, when the thermistor value is low, that is, indicates the low temperature, the time during which the output duty is the tduty is made much shorter than the case of the medium temperature (time Tc in FIG. 14). Note that, the time during which the output duty is the sduty may be equal regardless of the temperature.

In this manner, according to the present embodiment 4, as the temperature is high, the time during which the duty is reduced is made long, so that it is possible to perform luminance control more finely.

Embodiment 5

Though an aspect in which the reduction amount of the luminance is set in accordance with the thermistor value (rtemp) has been described in the embodiment 3 described above, the LED_DUTY control referring to the thermistor value (rtemp) is not limited to the aspect.

Figure 15:
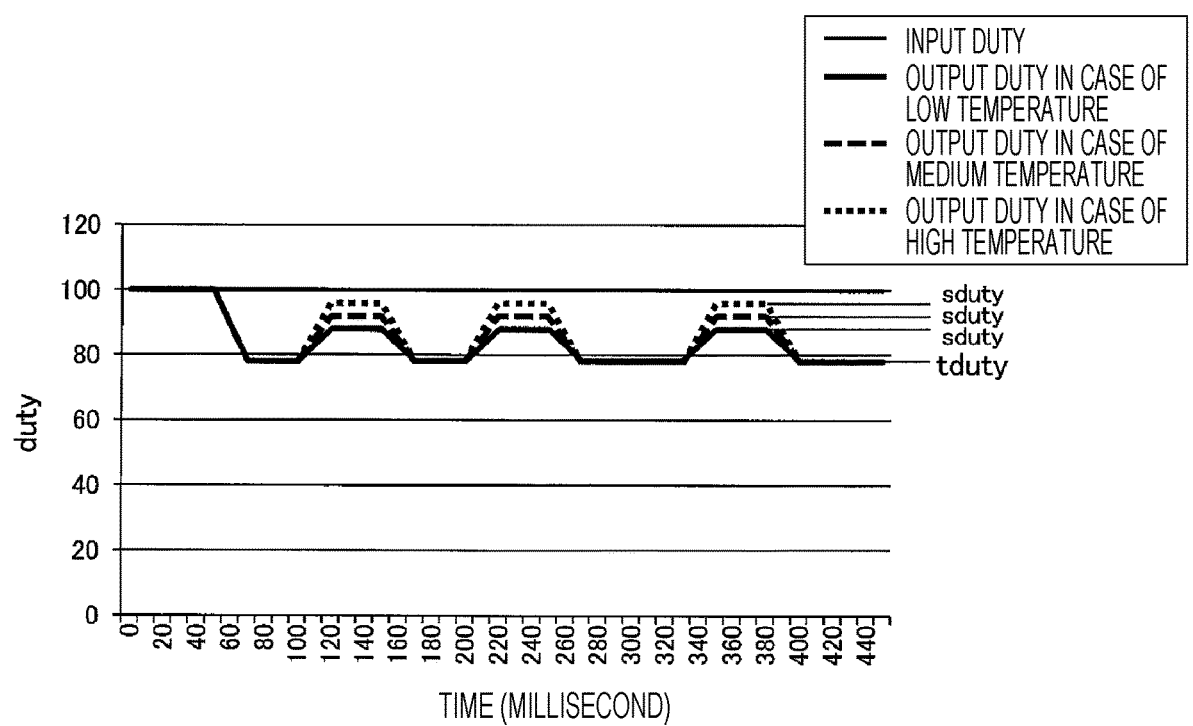
FIG. 15 is a graph for explaining a modified example of LED_DUTY control in the liquid crystal display device illustrated in FIG. 10.

For example, as the present embodiment 5, it is also possible to perform LED_DUTY control illustrated in FIG. 15 by using the liquid crystal display device 10A described in the embodiment 3. Specifically, in the present embodiment 5, provided is an aspect in which in a case where the thermistor value is low, a luminance value to be returned, that is, the sduty is made high, and in a case where the thermistor value is high, the sduty is made lower than the case where the thermistor value is low.

FIG. 15 is a graph illustrating a relationship between the LED_DUTY (input duty of FIG. 15) before being subjected to the control by the backlight driving control unit 8 and the LED_DUTY (three types of output duties of FIG. 15) subjected to the control by the backlight driving control unit 8 in the present embodiment 5. In FIG. 15, a horizontal axis of the graph indicates a time and a vertical axis of the graph indicates the LED_DUTY, and a value of the LED_DUTY that is output by being subjected to the control by the backlight driving control unit 8 when the LED_DUTY "100" is continuously input as the input duty is indicated.

As illustrated in FIG. 15, according to the present embodiment 5, thermistor values are classified into three ranks, and, in accordance with each of the ranks, the sduty of the output duty is set in accordance with each of the ranks. Note that, the tduty of the output duty may be equal regardless of the ranks.

In this manner, in the LED_DUTY control of the present embodiment 5, by differentiating a luminance value to be returned in accordance with a peripheral temperature, it is possible to perform luminance control more finely.

Note that, in FIG. 15, similarly to FIG. 9 of the embodiment 2, a time during which the luminance is reduced after a certain time has lapsed from start of the control is set to be longer than a time during which the luminance is increased. However, the invention is not limited thereto, and setting of the sduty according to the thermistor value (rtemp) is also able to be adopted in the embodiment 1.

CONCLUSION

A control device according to an aspect 1 of the invention is a control device 50 that controls a backlight 9 having a plurality of light sources (LEDs), and includes a control unit (backlight driving control unit 8) that performs lighting of each of the light sources (LEDs) with first brightness when a state where brightness of the light source, which is set in accordance with luminance information of an image obtained from a video signal, is set to predetermined brightness or more is kept, and repeats lighting with second brightness (tduty) and lighting with third brightness (sduty) when a predetermined time has lapsed, in which the second brightness and the third brightness are lower than the first brightness, and is characterized in that the second brightness (tduty) is lower than the third brightness (sduty), and a lighting period (time T1) with the second brightness (tduty) is longer than a lighting period (time T2) with the third brightness (sduty).

According to the aforementioned configuration, it is possible to effectively perform control with less load compared to a conventional configuration in which temperature is always monitored. In this manner, by dynamically controlling temperature rising of the light source (for example, LED), it is possible to suppress reduction in light emission efficiency and lifetime of the light source.

Moreover, since a temperature sensor is not necessary, the control device is able to be constructed inexpensively, and therefore, a liquid crystal display device that includes the control device and includes the liquid crystal panel and the backlight is able to be constructed inexpensively.

Moreover, according to the aforementioned configuration, for dynamically controlling temperature rising of the light source, not only one but two thresholds (second threshold and third threshold) of the brightness are defined. This makes it possible to suppress a level of the current reduction to the minimum. Thus, it is possible to suppress reduction of luminance of an actual video and sufficiently utilize merit of control by a high dynamic range (HDR) system.

In the control device 50 according to an aspect 2 of the invention, the lighting with the second brightness (tduty) and the lighting with the third brightness (sduty) are performed by changing a duty of the light source, in the aspect 1.

In the control device 50 according to an aspect 3 of the invention, the control unit (backlight driving control unit 8) may repeat the lighting with the second brightness (tduty) and the lighting with the third brightness (sduty) in each of periods of the same length before the predetermined time has lapsed, in the aspect 1 or 2.

According to the aforementioned configuration, for a while after driving of the backlight starts, a temperature of the backlight is in a low state, so that, during such a period, lengths of the lighting period with the second brightness (tduty) and the lighting period with the third brightness (sduty) are made the same with each other. This makes it possible to suppress reduction of luminance of an actual video caused by making the lighting period (time T1) with the second brightness (tduty) longer than the lighting period (time T2) with the third brightness (sduty).

The control device 50 according to an aspect 4 of the invention may be configured to further include a thermistor 20 that measures a temperature of the backlight 9, in which the control unit (backlight driving control unit 8) sets the second brightness (tduty) and the third brightness (sduty) on a basis of a measurement value of the thermistor 20, in any of the aspects 1 to 3.

According to the aforementioned configuration, when the measurement value of the thermistor 20 is lower (than a predetermined value), a reduction amount of power supplied to the backlight, that is, a reduction amount of luminance is reduced, and when the measurement value of the thermistor 20 is higher (than the predetermined value), the reduction amount of the power supplied to the backlight, that is, the reduction amount of the luminance is increased. This makes it possible to achieve fine luminance control.

The control device 50 according to an aspect 5 of the invention may be configured to further include a thermistor 20 that measures a temperature of the backlight 9, in which the control unit (backlight driving control unit 8) sets the lighting period (time T1) with the second brightness (tduty) on a basis of a measurement value of the thermistor 20, in any of the aspects 1 to 3.

According to the aforementioned configuration, when the measurement value of the thermistor 20 is lower (than a predetermined value), a time is made shorter (time Tc), and when the measurement value of the thermistor 20 is higher (than the predetermined value), a time is made longer (time Ta, time Tb), thus making it possible to achieve fine luminance control.

The control device 50 according to an aspect 6 of the invention may be configured to further include a thermistor 20 that measures a temperature of the backlight 9, in which the control unit (backlight driving control unit 8) sets, on a basis of a measurement value of the thermistor 20, the third brightness (sduty) to be higher as the measurement value is lower.

According to the aforementioned configuration, when the measurement value of the thermistor 20 is lower (than a predetermined value), by increasing an upper limit value of power supplied to the backlight, which is the third brightness, it is possible to suppress reduction of luminance of an actual video.

A liquid crystal display device 10, 10A according to an aspect 7 of the invention includes the control device 50 having the configuration described above; a liquid crystal panel 7; and the backlight 9 that has the plurality of light sources (LEDs).

The invention is not limited to each of the embodiments described above, and may be modified in various manners within the scope indicated in the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1 antenna
2 tuner
3 video processing unit
4 display control unit
5 area active control unit
6 liquid crystal driving unit
7 liquid crystal panel
8 backlight driving control unit (control unit)
9 backlight
10, 10A liquid crystal display device
20 thermistor
50 control device
71 screen center part
81 microcomputer
82 driver IC
91 center part
92 LED unit
93 LED_DUTY reading area
tduty third threshold (second brightness)
sduty second threshold (third brightness)

The invention claimed is:

1. A control device that controls a backlight having a plurality of light sources, the control device comprising:
a control unit that performs lighting of each of the light sources with first brightness when a state where brightness of the light source, which is set in accordance with luminance information of an image obtained from a video signal, is set to predetermined brightness or more is kept, and repeats lighting with second brightness and lighting with third brightness when a predetermined time has lapsed, the second brightness and the third brightness being lower than the first brightness, wherein
the second brightness is lower than the third brightness,
a lighting period with the second brightness is longer than a lighting period with the third brightness,
the control unit controls the light source by controlling duty,
the control unit starts monitoring of a duty ratio of the light source in a case where luminance indicated by the luminance information is equal to or less than a first threshold, and a gradation value equal to or more than a predetermined value is input in luminance distribution indicated by the luminance information, and
in a case where the control unit detects a certain value of the duty ratio which is not yet controlled and which corresponds to the first brightness of the light source,
when the detected duty ratio is equal to or more than a second threshold for a fixed time, the control unit controls brightness of the light source so that the light source has the second brightness corresponding to a duty ratio less than a third threshold which is smaller than the second threshold, and
when the detected duty ratio is less than the third threshold for another fixed time, the control unit controls the brightness of the light source so that the light source has the third brightness corresponding to the duty ratio equal to or larger than the second threshold.

2. The control device according to claim 1, wherein the lighting with the second brightness and the lighting with the third brightness are performed by changing a duty of the light source.

3. The control device according to claim 1, wherein the control unit repeats the lighting with the second brightness and the lighting with the third brightness so that the lighting period with the second brightness and the lighting period with the third brightness are same in length, before the predetermined time has lapsed.

4. The control device according to claim 1, further comprising
- a thermistor that measures a temperature of the backlight, wherein
- the control unit sets the second brightness and the third brightness on a basis of a measurement value of the thermistor.

5. The control device according to claim 1, further comprising
- a thermistor that measures a temperature of the backlight, wherein
- the control unit sets the lighting period with the second brightness on a basis of a measurement value of the thermistor.

6. The control device according to claim 1, further comprising
- a thermistor that measures a temperature of the backlight, wherein
- the control unit sets, on a basis of a measurement value of the thermistor, the third brightness to be higher as the measurement value is lower.

7. A liquid crystal display device comprising:
- the control device according to claim 1;
- a liquid crystal panel; and
- the backlight that is arranged on a rear surface side of the liquid crystal panel and has the plurality of light sources.

\* \* \* \* \*